(12) United States Patent
Gopal et al.

(10) Patent No.: US 8,310,520 B2
(45) Date of Patent: Nov. 13, 2012

(54) FLEXIBLE DECOMPOSITION AND RECOMPOSITION OF MULTIMEDIA CONFERENCING STREAMS USING REAL-TIME CONTROL INFORMATION

(75) Inventors: Rajat Gopal, Shrewsbury, MA (US); John Nicol, Framingham, MA (US)

(73) Assignee: Avaya Inc., Basking Ridge, NJ (US)

( * ) Notice: Subject to any disclaimer, the term of this patent is extended or adjusted under 35 U.S.C. 154(b) by 588 days.

(21) Appl. No.: 12/543,998

(22) Filed: Aug. 19, 2009

(65) Prior Publication Data

US 2011/0043600 A1    Feb. 24, 2011

(51) Int. Cl.
*H04N 7/14*    (2006.01)
(52) U.S. Cl. .................. 348/14.08; 348/14.01
(58) Field of Classification Search .......... 348/14.01, 348/14.08, 14.09; 370/259, 260; 709/204; 375/240.08, 240.26
See application file for complete search history.

(56) References Cited

U.S. PATENT DOCUMENTS

| | | | |
|---|---|---|---|
| 6,288,740 B1 | 9/2001 | Lai et al. | |
| 6,381,364 B1 | 4/2002 | Gardos | |
| 7,113,992 B1 | 9/2006 | Even | |
| 2003/0169330 A1 | 9/2003 | Ben-Shachar et al. | |
| 2007/0291106 A1* | 12/2007 | Kenrick et al. | 348/14.01 |
| 2009/0282103 A1* | 11/2009 | Thakkar et al. | 709/204 |
| 2009/0309956 A1* | 12/2009 | Hawkins et al. | 348/14.08 |

FOREIGN PATENT DOCUMENTS

EP    1564992    8/2005

OTHER PUBLICATIONS

Gehrig et al., "Distributed Compression of Multi-View Images using a Geometric Approach," in Proc. of IEEE International Conference on Image Processing (ICIP), Sep. 2007, San Antonio, Texas, 4 pages.
Gehrig et al., "Distributed Compression of the Plenoptic Function," in Proc. of IEEE International Conference on Image Processing (ICIP), Oct. 2004, Singapore, pp. 529-532.
"Enhanced Vision System," at http://www.hcltech.com/aerospace-and-defense/enhanced-visionsystem/, HCL Technologies Limited, accessed as early as Jan. 16, 2009, 7 pages.
Doulamis et al., "Optimal Multi-Content Video Decomposition for Efficient Video Transmission over Low-Bandwidth Networks," in Proceedings of Int. Conf. on Image Processing, at http://citeseerx.ist.psu.edu/viewdoc/summary?doi=10.1.1.60.3522, Dec. 2002, 4 pages.
Extended European Search Report for European Patent Application No. 10172581.0, dated Oct. 27, 2010.

* cited by examiner

*Primary Examiner* — Tuan Nguyen
(74) *Attorney, Agent, or Firm* — Sheridan Ross P.C.

(57) ABSTRACT

A multimedia conferencing system is presented that can modify the composite multimedia stream into separate multimedia streams. Two or more video conference participants send multimedia streams, capturing and encoding the conference at the participant's location, to a multimedia server. The multimedia server includes a multipoint control unit that creates a composite multimedia display, which includes video regions corresponding to at least two of the multimedia streams from the participants. A composite multimedia stream describes the composite multimedia display. The ancillary server receives the composite multimedia stream from the multipoint control unit together with static and dynamic control information, which describes the format and layout of the composite multimedia display and the composite multimedia stream. Using the dynamic and static control information, the ancillary server decomposes the composite multimedia stream into two or more constituent streams. The two or more constituent streams may then be separately processed.

20 Claims, 7 Drawing Sheets

FLEXIBLE DECOMPOSITION AND RECOMPOSITION OF MULTIMEDIA CONFERENCING STREAMS USING REAL-TIME CONTROL INFORMATION

BACKGROUND

Video conferencing servers, operating in "continuous presence" mode, use a composite image to display some or all of the parties involved in a video conference. A composite image has two or more areas (or "regions") of the display that show different video images from the different participants. Generally, this composite image may be constructed by a server and transmitted in real-time to the participants. This single composite image stream allows every participant to view all or a subset of the conference participants from their terminal during the video conference While this system provides a useful communication system, it is inflexible. Sometimes the end user (or application) could better utilize one or more sub-regions from the composite image in preference to the entire composite image. For example, an end user may want to record any communications from one of the participants but disregard content from the other participants. Unfortunately, the server providing the composite image may not support the functionality required to provide different composite multimedia images to the different participants. Or, if the server does include that functionality, it is generally very expensive and causes the server to perform inefficiently.

SUMMARY

It is with respect to the above issues and other problems that the embodiments presented herein were contemplated. Herein, a multimedia conferencing system is presented that can modify the composite multimedia image stream into separate multimedia streams. The conferencing system includes two or more participants, a multimedia server, and one or more ancillary servers. Each video-enabled participant sends a multimedia stream, capturing and encoding the conference at the participant's location, to the multimedia server. The multimedia server includes a multipoint control unit ("MCU") that creates a composite multimedia stream, from the separate participant streams, into a composite multimedia image, which shows at least two of the multimedia streams from the participant locations. An ancillary server receives the composite multimedia stream from the MCU together with static and dynamic control information. The static and dynamic control information describes the format and layout used in and layout used in the construction of the composite multimedia image and the composite multimedia stream. With the dynamic and static control information, the ancillary server decomposes the composite multimedia stream into two or more constituent streams. The two or more constituent streams may then be separately processed.

Exemplary applications for the embodiments include supporting an enterprise quality/integrity policy or set of policies (e.g., record video streams of all company employees engaged in inter-enterprise video conferences, or call center agents engaged in conferences with particular customers or partners) or in support of government legal interception requirements to record video streams of specific conferees or participants from particular locations. Other applications will be readily apparent to one of ordinary skill in the art.

The embodiments can have a number of advantages. For example, the system can provide flexible, real-time or near real-time decomposition and/or recomposition processing of multimedia conferencing streams without unduly burdening the supporting MCUs. Using real-time control information exchanged between network elements as part of their normal operation, the system can map from segments of one communication medium or modality to segment another (different) medium or modality. In one configuration, it performs spatial segmentation by mapping voice activity in an audio stream of a call to the spatial location of the speaker in the video stream of the call. It can regenerate video display layouts flexibly building on decomposed video elements. It can index a multimedia stream using timing information indicating when a given participant is active and/or inactive, such that the corresponding video element can be determined (even for conferencing mixes for which spatial layout changes dynamically driven by changes of the active speaker). These are significant accomplishments as the relative locations of the video elements may change dynamically with the active speaker. Information technology benefits are realized, particularly information storage overhead reduction in case of recording servers or targeted speaker mixes for legal intercept applications. It can provide these benefits by monitoring and collecting the control information required for decomposition and ancillary servers (e.g. via techniques such as network traffic sniffing), which not only are transparent to either the endpoints or the media server but also do not add an unacceptable level of processing burden to an expensive resource, such as a media server or MCU. Ancillary servers can provide additional desirable operations, including the application of video transforms, such as scaling, block extraction, transcoding, and filtering, to generate new, application-specific display layouts. The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH- EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the invention. Rather, the ensuing description will provide those skilled in the art with an enabling description for implementing the embodiments. It being understood that various changes may be made in the function and arrangement of elements without departing from the spirit and scope of the invention as set forth in the appended claims.

The embodiments presented herein provide a system and methods for decomposing a composite multimedia stream (which forms a composite multimedia image) into two or more constituent streams using control information. In embodiments, control information can be metadata received before, with, or after the composite multimedia stream. With the metadata and the constituent streams, the system can then form or provide different presentations of the data forming the original composite image.

Figure 1:
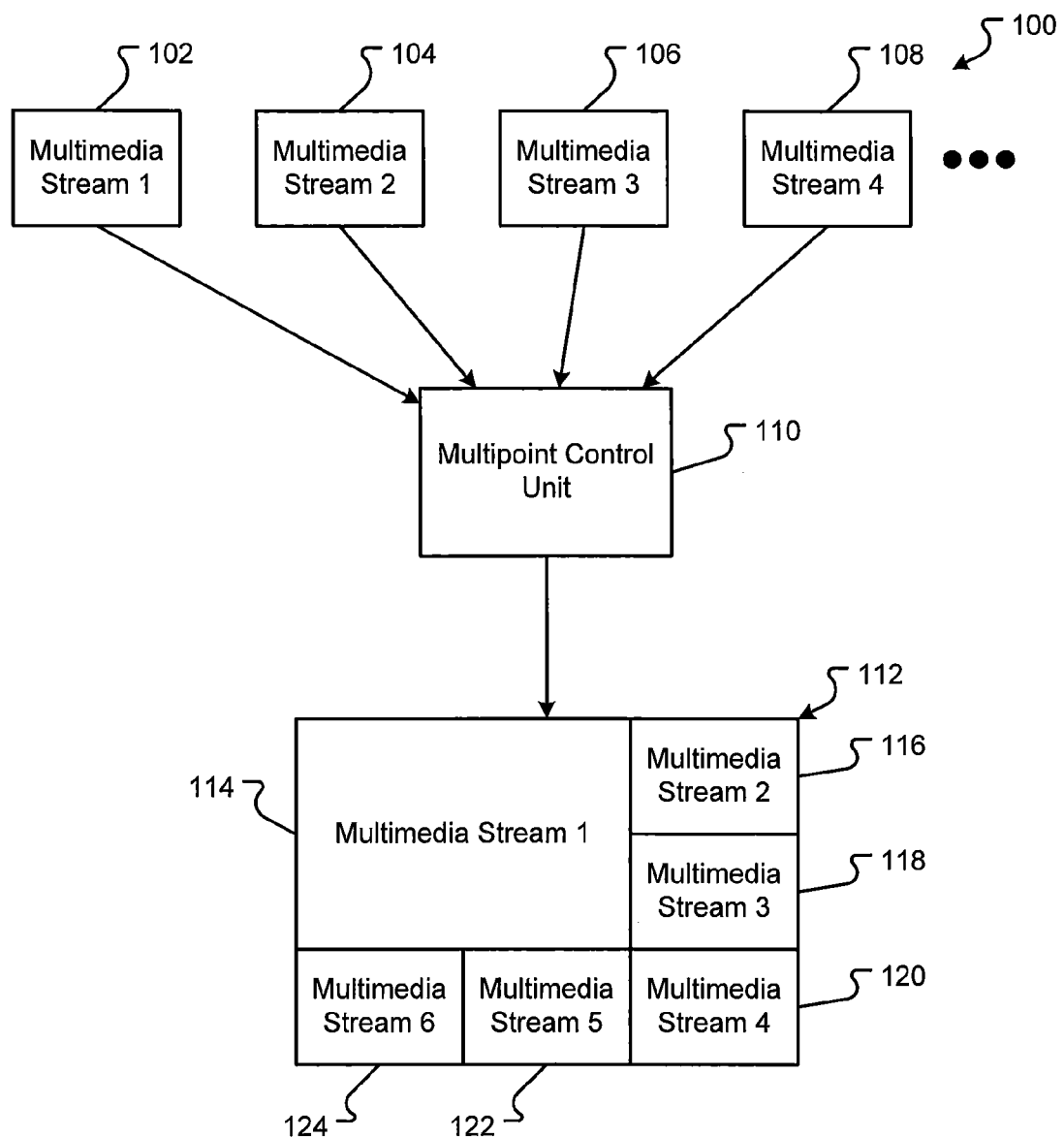
FIG. 1 is a block diagram of a multipoint control unit that can create a composite multimedia stream.

FIG. 1 shows a video conference image 112 with six participants. Video conferencing equipment located at each participant's location captures and encodes video, audio, and/or other data and forms a multimedia stream 102, 104, 106, 108, etc. A multimedia stream 102, 104, 106, 108, etc. defines an on-going stream or flow of data that captures the actions of the participants. The multimedia streams 102, 104, 106, 108, etc. are generally sent to a multipoint control unit (MCU) 110.

The multipoint control unit 110 may then create a composite image 112 from the multimedia streams. A composite image 112 is a display for a display device that includes two or more regions 114, 116, 118, 120, 122, and/or 124 within the display area 112. A region 114, 116, 118, 120, 122, and/or 124 is a portion of the display defined by some control information (for example, coordinates, dimensions, etc.). For example, the composite display 112 in FIG. 1 has six regions 114, 116, 118, 120, 122, and/or 124, one for each multimedia stream 102, 104, 106, 108, etc. As the video conference is conducted, each of the multimedia streams 102, 104, 106, 108, etc. can be displayed in the regions 114, 116, 118, 120, 122, and/or 124 of the composite image 112. The composite multimedia data for the composite image 112 can be packaged into a composite multimedia stream and sent back to the participants for display on each participant's terminal video conferencing equipment.

Figure 2:
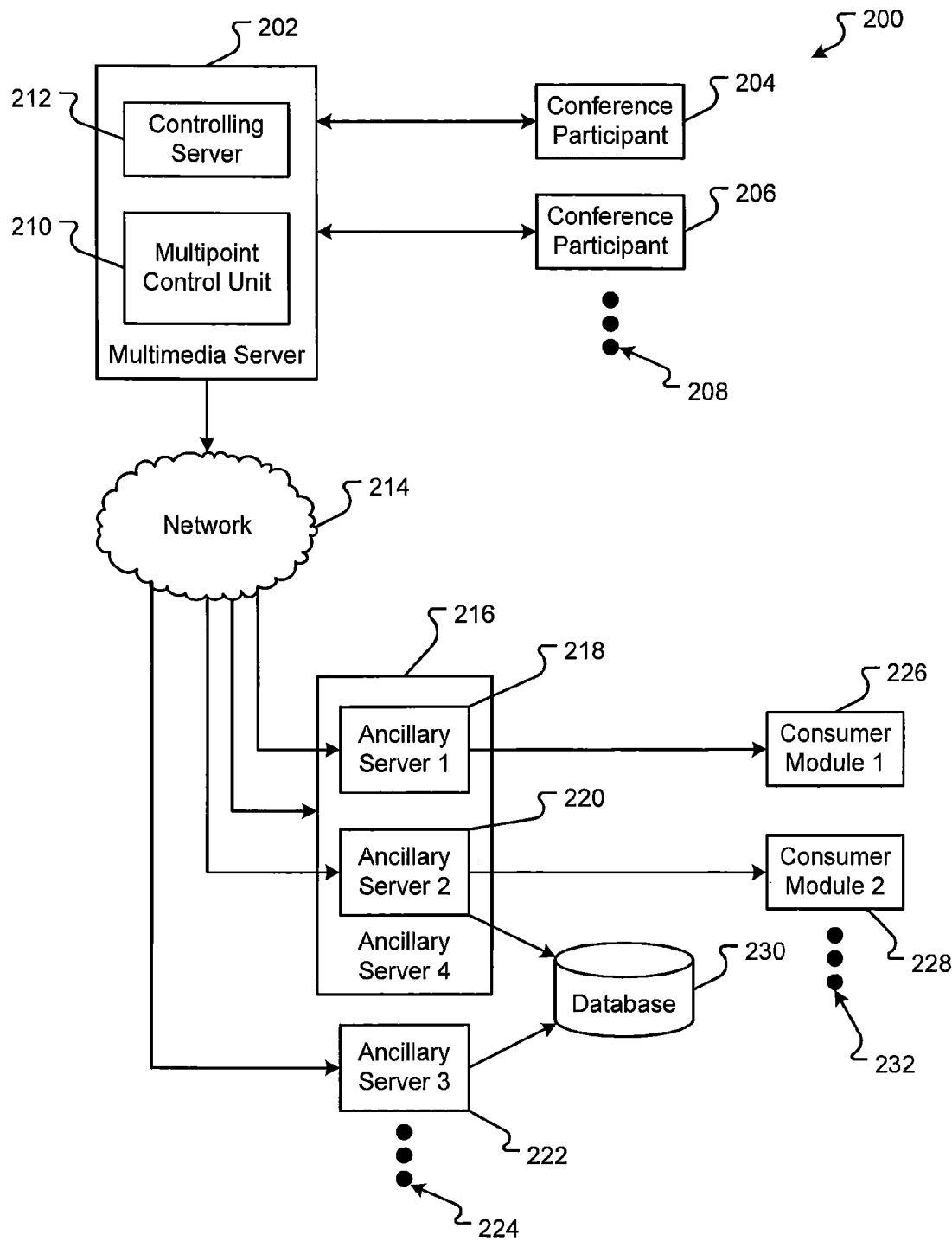
FIG. 2 is a block diagram of an embodiment of a multimedia system operable to decompose and recompose composite multimedia streams.

An embodiment of a system 200 operable to decompose and recompose a composite multimedia stream is shown in FIG. 2. The several components of the system 200 may be hardware, software, or a combination of hardware and software. Descriptions of the computer system environment and the computer systems which may embody the several components of system 200 are described in conjunction with FIGS. 6 and 7. As such, a functional description of the several components of system 200 shall follow.

In embodiments, a multimedia server 202 creates a composite multimedia stream. During a video conference, two or more participants 204 and 206 can create a multimedia stream. Video conferencing equipment at each participants' location may capture and encode the video for the conference, the audio of those speaking during the conference, and presentations of other materials (slide shows, video playback, etc.). The captured and encoded media form the multimedia streams. The multimedia streams may be a stream of video, audio, or other data that represents the conference at the participants' location. In embodiments, the multimedia stream is a stream of digital data, such as an MPEG-encoded video stream. However, video, audio, and other data can be captured and encoded separately and provided as two or more separate streams of data that are synchronized using time stamps or other information. There may be more participants in the video conference than those shown, as represented by ellipses 208.

The multimedia server 202 receives the two or more multimedia streams from the conference participants 204 and/or 206. A multimedia server 202 may include a multipoint control unit 210, a controlling server 212, and possibly one or more other components. The MCU 210 receives and composes the two or more multimedia streams into a composite multimedia stream, as explained in conjunction with FIG. 1. To determine the format of the composite multimedia stream, the controlling server 212 provides control information to the MCU 210. The control information can include static control information and dynamic control information. The static control information may be predetermined or user-selected. Dynamic control information, in contrast, includes control information that does change with time. In embodiments, control information is metadata or metainformation. Control information may be embodied as a separate stream of data or as part of the multimedia data created and sent by the multimedia server 202. For example, the metadata can include time stamps or other information in packet headers, data frame or other packetizing information, header information for transport media data packets or video image data packets, etc. The metadata or control information provides the information used to decompose and recompose the multimedia streams as described hereinafter.

After the composite multimedia stream is formed, the MCU 210 can send the composite multimedia stream back to the conference participants 204 and/or 206 to be displayed on the video conferencing equipment. Further, the MCU 210 can send the composite multimedia stream to a network 214 to be received by one or more ancillary server 216, 218, 220, and/or 222. The network 214 may be as explained in conjunction with FIG. 6. The ancillary servers 216, 218, 220, and/or 222 are computer systems and/or software operable to decompose and recompose the composite multimedia stream. In embodiments, the ancillary servers 216, 218, 220, and/or 222 are computer systems as explained in conjunction with FIGS. 6 and 7. An ancillary server 216 can be a hardware computer system operable to execute one or more functional software servers 218 and/or 220. Thus, ancillary server 4 216 may receive data and determine to which server 218 or 220 to send the data for processing. As such, the ancillary server 4 216 is shown receiving data but not sending an output to another application. Embodiments of the system 200 can include fewer or more ancillary servers 216, 218, 220, and/or 222, as represented by ellipses 224.

An ancillary server 216, 218, 220, or 222 executes to decompose the composite multimedia stream. Further, the ancillary server 216, 218, 220, or 222 may recompose, filter, alter, or otherwise process the decomposed multimedia stream into one or more of the constituent multimedia streams or into a new composite multimedia stream. The recomposition of the new composite multimedia stream may be governed by user-specified control information or by the requirements of a user application. The output from the ancillary server 216, 218, 220, and/or 222 may be sent to one of several components including, but not limited to, consumer module 1 226, consumer module 2 228, or multimedia content store 230.

A consumer module 1 226 and consumer module 2 228 can be a user application or other system operable to process or use the output from the ancillary server 216. For example, consumer module 1 226 may be a video review function required by the government to eliminate objectionable language from video broadcasts. In other examples, consumer module 2 228 can be another video participant that desires to view a different composite image than the composite image provided by the MCU 210. Further, a separated multimedia stream or recomposed multimedia stream can also be stored into multimedia content store 230. As shown, two or more ancillary servers 220, and 222 may share the multimedia content store 230. Thus, the different outputs from different ancillary servers 216, 218, 220, or 222 can be stored. The system 200 can include more or fewer consumer modules, as represented by ellipses 232 and/or more or fewer ancillary servers 216, 218, 220, and/or 222, as represented by ellipses 224.

Figure 3:
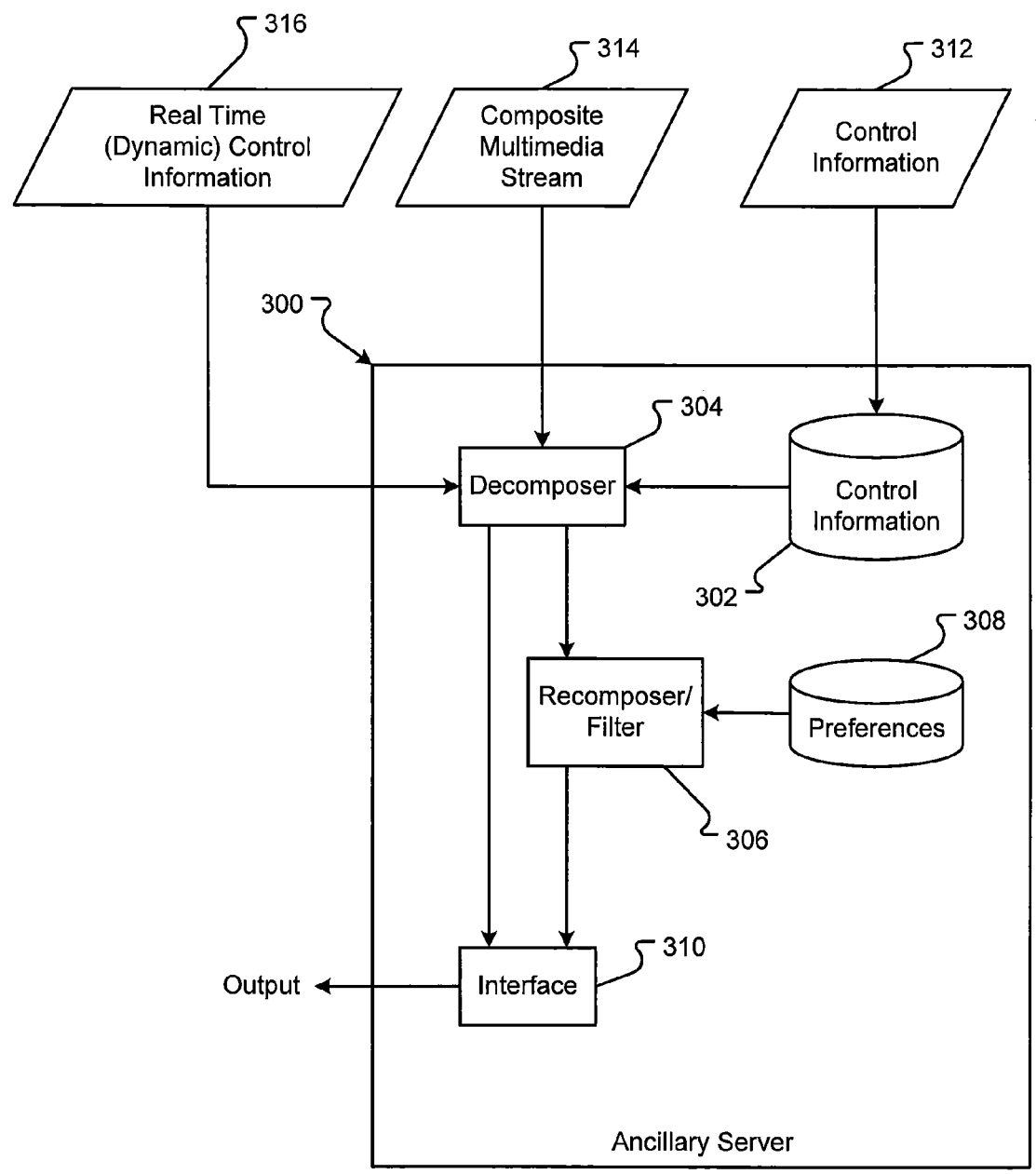
FIG. 3 is a block diagram of an embodiment of an ancillary server operable to decompose and recompose composite multimedia streams.

An embodiment of an ancillary server 300 is shown in FIG. 3. The ancillary server 300 can be the same as or similar to ancillary servers 216, 218, 220, and/or 222 (FIG. 2). In embodiments, the ancillary server 300 is a computer system as described in conjunction with FIG. 7. The ancillary server 300 can have one or more components, which may execute as computer modules. The ancillary server 300 can include one or more of, but is not limited to, a control information database 302, a decomposer module 304, a recomposer (and/or filter) 306, a preferences database 308, and/or an interface 310.

The control information database 302 can store control information 312 that describes a format for the composite multimedia stream 314. The control information 312 may be static control information that does not change over time. As such, the control information database 302 need not update the control information 312. Rather, the control information 312 can be received once from the MCU (FIG. 2) or the controlling server 212 (FIG. 2) and stored permanently for use in decomposing the composite multimedia stream 314. The control information 312 can describe a format for a composite multimedia display provided by the composite multimedia stream 314. The format of the composite multimedia display can include a layout for the composite multimedia display. The layout may have two or more regions in the composite multimedia display, as described in conjunction with FIG. 1. The control information database 302 can send or provide the control information 312 to the decomposer 304.

The decomposer module 304 receives the control information 312, the composite multimedia stream 314, and dynamic control information 316. The decomposer module 304 can determine the format for the composite multimedia stream 314 from the control information 312 and the dynamic control information 316. Then, the decomposer module 304 may decompose or separate the composite multimedia stream 314 into two or more constituent streams or constituent parts based on the control information 312 and/or 316. One or more of the constituent streams decomposed from the composite multimedia stream 314 can be sent to an interface module 310 to be sent to a user module 226 or 228 (FIG. 2). In another embodiment, the one or more of the constituent streams decomposed from the composite multimedia stream 314 are sent to a recomposer 306.

A recomposer module 306 can recompose two or more constituent streams of the decomposed composite multimedia stream 314 into a second composite multimedia stream. In other words, the recomposer 306 can create a new composite multimedia stream for a new composite multimedia display from the decomposed parts of the original composite multimedia stream 314. Further, the recomposer 306 may include a filter module operable to filter out one of the constituent streams of the composite multimedia stream 314 to create the second composite multimedia stream. The second composite multimedia stream may include only one of the constituent parts of the composite multimedia stream 314 or fewer constituent streams than the composite multimedia stream 314. The second or new composite multimedia stream can be sent to the interface module 310 to be sent to a user module 226 or 228 (FIG. 2) or to a multimedia content store 230 (FIG. 2). The interface module 310 is any hardware and/or software that allows the ancillary server 300 to communicate with another component or system.

The ancillary server 300 may also include a preferences database 308. The preference database 308 can store a preference for the second or recomposed composite multimedia stream. A preference can be control information from the user module 226 or 228 (FIG. 2) or a multimedia content store 230 (FIG. 2). The preference describes a desired format for the second composite multimedia stream or the second composite multimedia display. The preference database 308 may store the preferences and provide the preferences to the recomposer 306 to assist in recomposing, filtering, or processing the decomposed multimedia stream. In embodiments, the preference multimedia content store 230 can include two or more sets of preferences. Each set of preferences may match the requirements of different and distinct applications.

Figure 4A:
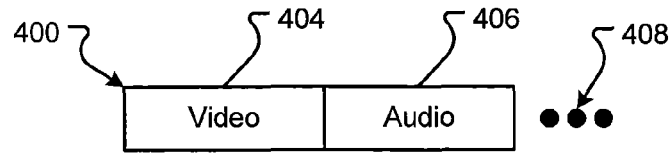
FIGS. 4A-4D are block diagrams of data structures that are stored, sent, or received by one or more computer systems when decomposing and/or recomposing composite multimedia streams.
Figure 4B:
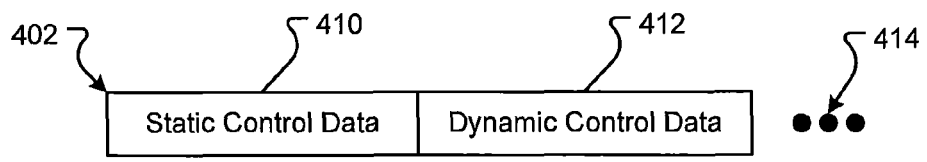
Figure 4C:
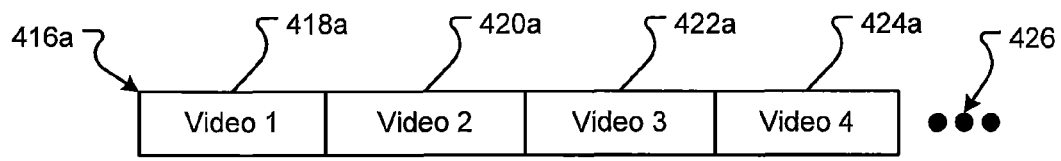

An embodiment of a data structure embodying a composite multimedia stream 416a is shown in FIG. 4C. A composite multimedia stream 416a can be composed of two or more constituent streams included in two or more data fields. There may be more or fewer constituent streams than those shown in FIG. 4C, as represented by ellipses 426. Each constituent stream or constituent part can be a multimedia stream. For example, composite multimedia stream 416a comprises multimedia streams 418a, 420a, 422a, and 424a. The separate multimedia streams 418a, 420a, 422a, and 424a are compiled and formatted into a single composite multimedia stream 416a that has two or more constituent streams.

Figure 4D:
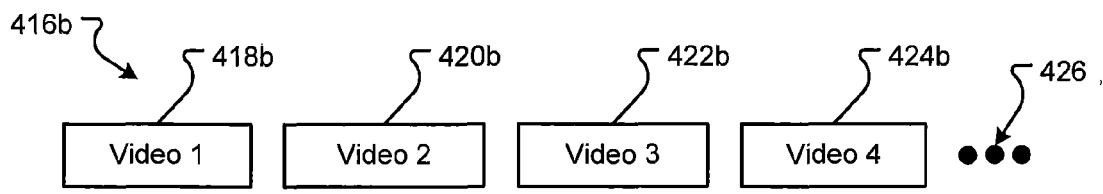

In contrast, the composite multimedia stream 416a is shown as two or more data structures embodying a decomposed multimedia stream 416b in FIG. 4D. The decomposed multimedia stream 416b includes at least one of the same constituent streams or data fields as the composite multimedia stream 416a. For example, the decomposed multimedia stream 416b includes multimedia streams 418b, 420b, 422b, and 424b. However, unlike composite multimedia stream 416a, the decomposed multimedia stream 416b separates the multimedia streams 418b, 420b, 422b, and 424b into separate and discrete multimedia streams. Thus, the constituent streams of the composite multimedia stream 416a may be processed apart for the other constituent streams of or the composed composite multimedia stream 416a.

Embodiments of data structures 400 and 402 embodying the information received by the ancillary server 300 for decomposing a composite multimedia stream 416a are shown in FIGS. 4A and 4B. The data structures 400 and 402 may include two or more data fields; the data structures 400 and 402 can have fewer or more data fields than those shown in FIGS. 4A and 4B, as represented by ellipses 408 and 414. In embodiments, the data structure 400 includes data fields for video data 404 and/or audio data 406. The video and audio data may be encompassed in a single multimedia data field. Generally, the video data field 404 includes the visual video data for the composite multimedia stream. The audio data field 406 includes the audio data for the composite multimedia stream.

Control data 402, shown in FIG. 4B, represents the control data received by or stored and retrieved by the ancillary server 300 (FIG. 3). Control data 402 can thus include static control data field 410 and dynamic control data field 412. As explained in conjunction with FIG. 2, static control information or data 410 is control information that does not change with time. For example, static control information 410 can include one or more of, but is not limited to, the composite image format, the size of the regions in the composite image, which region a multimedia stream is assigned, etc. An example of static control information 410 may be as follows:

```
<msml version="1.1">
 <createconference name="qsplit">
 <audiomix>
  <asn/>
  <n-loudest n="1"/>
 </audiomix>
 <videolayout type="text/msml-basic-layout">
  <root size="CIF"/>
  <region id="1" left="0" top="0" relativesize="2/3"/>
  <region id="2" left="67%" top="0" relativesize="1/3"/>
  <region id="3" left="67%" top="33%" relativesize="1/3"/>
  <region id="4" left="67%" top="67%" relativesize="1/3"/>
  <region id="5" left="33%" top="67%" relativesize="1/3"/>
  <region id="6" left="0" top="67%" relativesize="1/3"/>
 </videolayout>
 </createconference>
</msml>
```

Above, the static control information 410 generates or describes a layout for the composite multimedia image as shown in FIG. 1. Another example of static control information 410 is shown below:

```
<!- Join to region 1 -->
<msml version="1.1">
 <join id1="conn:1" id2="conf:qsplit">
  <stream media="audio"/>
  <stream media="video" dir="to-id1"/>
  <stream media="video" dir="from-id1" display="1"/>
 </join>
</msml>
<!- Join to region 2 -->
<msml version="1.1">
 <join id1="conn:2" id2="conf:qsplit">
  <stream media="audio"/>
  <stream media="video" dir="to-id1"/>
  <stream media="video" dir="from-id1" display="2"/>
 </join>
</msml>
<!- Join to region 3 -->
<msml version="1.1">
 <join id1="conn:3" id2="conf:qsplit">
  <stream media="audio"/>
  <stream media="video" dir="to-id1"/>
  <stream media="video" dir="from-id1" display="3"/>
 </join>
</msml>
<!- Join to region 4 -->
.........
<!- Join to region 5 -->
.........
<!- Join to region 6 -->
```

Above, the static control information 410 assigns each predetermined multimedia stream received from each participant to at least one region of the composite image as shown in FIG. 1. As such, the static control information 410 helps determine how the composite image will be rendered.

Dynamic control information 412 includes control information that does change with time or in response to an action or event. Examples of dynamic control information 412 can include one or more of, but is not limited to, which multimedia stream may be highlighted in a main or expanded region 114 (FIG. 1) of the composite image 112 (FIG. 1), algorithms to determine the highlighted multimedia stream, to which region of the composite multimedia display layout a constituent stream of the composite multimedia stream is assigned, etc. In other words, the dynamic control information 412 temporally describes which constituent stream of the composite multimedia stream 416 is displayed in which region of the composite multimedia display 112. An example of dynamic control information 412 is as follows:

```xml
<?xml version="1.0" encoding="US-ASCII"?>
<msml version="1.1">
    <event name="msml.conf.asn" id="conf:example">
        <name>speaker</name>
        <value>conn:hd93tg5hdf</value>
        <name>speaker</name>
        <value>conn:w8cn59vei7</value>
        <name>speaker</name>
        <value>conn:p78fnh6sek47fg</value>
    </event>
</msml>
```

The above dynamic control information 412 alerts the MCU 210 (FIG. 2) to which speaker at which participant location is active. For example, the speaker having the highest volume input may be the active speaker. With different speakers participating at different times, this information can change during a video conference. The multimedia stream having the active speaker may be shown in the expanded section 114 (FIG. 1) of the composite image 112 (FIG. 1). The example of dynamic control information above dictates changing the display according to the active speaker. Thus, the dynamic control information 412 changes in response to an assignment change to the composite multimedia display layout. Both the static control information 410 and the dynamic control information 412 can assist the ancillary server 300 (FIG. 3) in decomposing and recomposing the composite multimedia stream. It should be noted that the data structures 400 and 402 are shown as two separate data structures encompassing different data. However, the data may be embodied in a single data stream. For example, control data 402 may be sent and received with or in-band with the video data 404 or the audio data 406.

An ancillary server 218 can also request types of control data. For example, the ancillary server may send the request AUDIT_CONFERENCE to the MCU 210. The MCU 210 can return a list of all participants in a teleconference to the ancillary server 218; the list can include one or more connection identifiers for the participants. To provide information about certain named participants, the ancillary server 218 may also send a MAP_CONNECTION request to the MCU 210. The MUC 210 can response to the MAP_CONNECTION request by providing a username associated with the connection identifiers provided in response to the AUDIT_CONFERENCE request. A consumer module 1 226 may be interested in inputs to the teleconference from one or more selected participants. With the information from the AUDIT_CONFERENCE and MAP_CONNECTION requests, the ancillary server 218 can provide the information about the selected participants by username.

Figure 5:
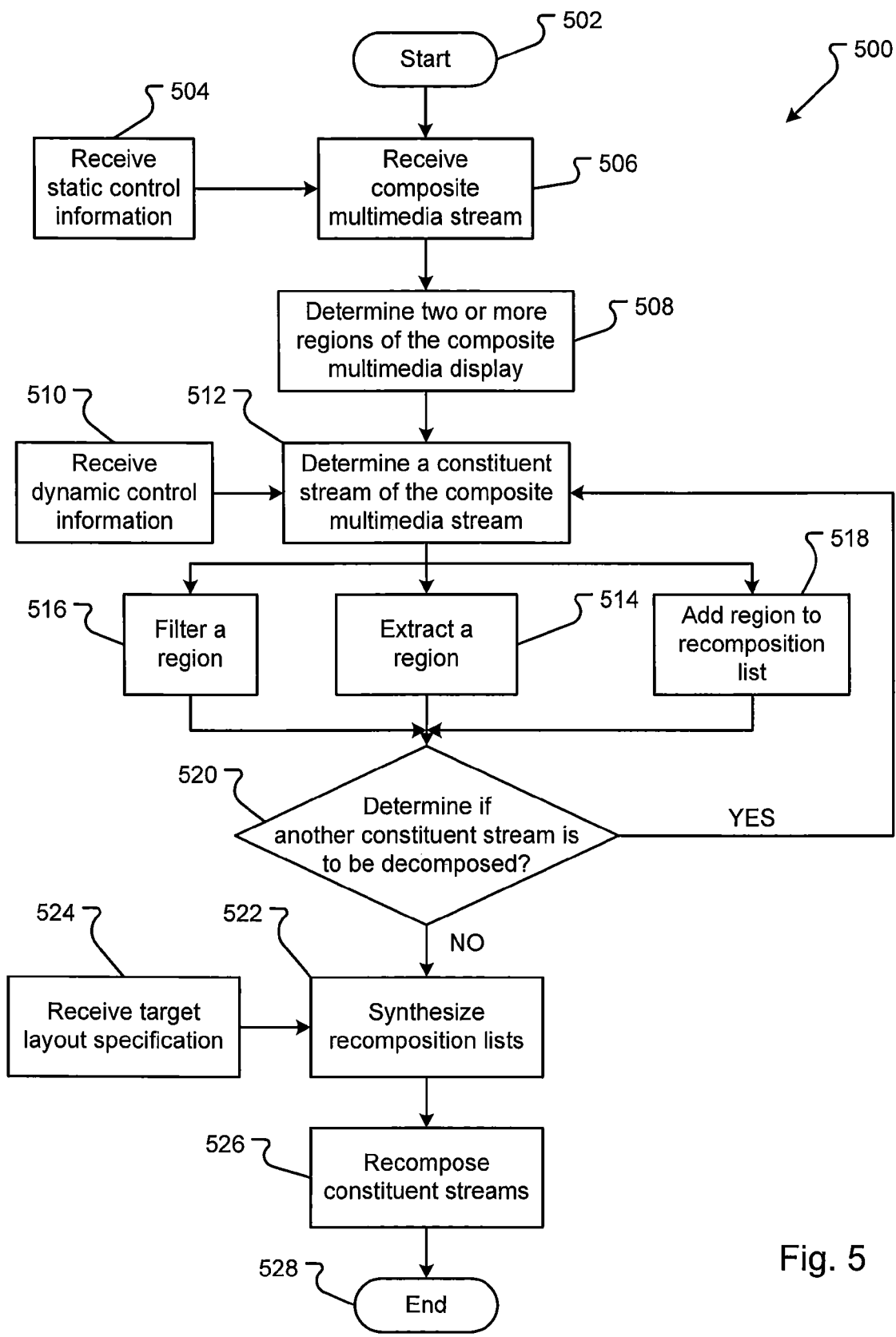
FIG. 5 is a flow diagram of an embodiment of a process for decomposing and processing a composite multimedia stream.

An embodiment of a method 500 for decomposing and recomposing a composite multimedia stream 416 is shown in FIG. 5. Generally, the method 500 begins with a start operation 502 and terminates with an end operation 528. While a general order for the steps of the method 500 are shown in FIG. 5, the method 500 can include more or fewer steps or arrange the order of the steps differently than those shown in FIG. 5. The method 500 can be executed as a set of computer-executable instructions executed by a computer system and encoded or stored on a computer readable medium. Hereinafter, the method 500 shall be explained with reference to the systems, components, modules, data structures, etc. described in conjunction with FIGS. 1-4D.

The ancillary server 300 (similar to ancillary server 216, 218, 220, or 222) receives static control information 410 from an MCU 210 through a network 214 in step 504. The static control information 410 may be received before a composite multimedia stream 416a and stored in a control information database 302. Further, the ancillary server 300 receives the composite multimedia stream 416 from the MCU 210 through a network 214 in step 506. The composite multimedia stream 416 provides a composite multimedia display 112.

The decomposer 304 determines two or more regions for the composite multimedia display 112 using the static control information 410 in step 508. To determine the regions, the decomposer 304 reads the static control information 410 to determine the regions 114, 116, 118, 120, 122, and/or 124 forming the composite multimedia display 112. For a particular composite multimedia stream 416, the decomposer 304 can also determine to which region each constituent stream of the composite multimedia stream 416 shall be assigned.

Either during (substantially in real time) or after the video conference, the ancillary server 300 also receives the dynamic control information 412 in step 510. In embodiments, the ancillary server 300 receives new dynamic control information 412 as the dynamic control information 412 changes during the video conference. For example, the dynamic control information 412 can change as the multimedia stream having the active microphone changes; new dynamic control information 412 can be pushed to the ancillary server 300 from the MCU 210. In other embodiments, the ancillary server 300 may receive the dynamic control information 412 periodically (for example, every second or minute) or continuously.

For a predetermined time in the video conference, the ancillary server 300 determines a constituent stream of the composite multimedia stream 416 associated with a region of the composite multimedia display 112 in step 512. To determine the constituent stream, the decomposer 304 reads the dynamic control information 412 to determine which constituent stream 418a, 420a, 422a, and 424a of the composite multimedia stream 416 is assigned to which region 114, 116, 118, 120, 122, and/or 124 forming the composite multimedia display 112. For example, if the decomposer 304 is interested in the first constituent stream 418a of the composite multimedia stream 416, the decomposer 304 may determine if the first constituent stream 418a has the active microphone from the dynamic control information 412. If the 418a does have the active microphone, the decomposer 304 can determine to which region 114 the multimedia stream 418b with the active microphone is assigned. Similarly, the decomposer 304 can determine a second constituent stream 420a of the composite multimedia stream 416 that may not have the active microphone and is assigned to a second region 116 of the composite multimedia display 112.

Then, the ancillary server 300 may perform one or more actions on the constituent stream. In an embodiment, the ancillary server 300 can extract at least a one or more constituent streams 418a, 420a, 422a, and 424a (a discrete multimedia stream) from the composite multimedia stream 416a in step 514. The process of extraction is to separate one or more streams from the group of constituent streams 418a, 420a, 422a, and 424a. For example, the decomposer 304 can extract or copy the data associated with the first constituent stream 418a of the composite multimedia stream 416a from that region 114 of the composite multimedia display 112 and assemble the extracted data into a constituent multimedia stream 418b. The decomposer 304 can extract a second or more constituent streams from the composite multimedia stream 416a and create other constituent multimedia stream 420b, 422b, or 424b from the other extracted constituent streams of the composite multimedia stream 416b. The ancillary server 300 may extract the first constituent stream 418a from a first determined region of the composite multimedia display 112 when a microphone is active and a second determined region when the microphone is not active. In embodiments, the ancillary server 300 extracts only the audio or only the video from a composite multimedia stream 416a. The extracted audio or video data may be associated with one or more of the constituent streams 416b.

A filter 306 can filter a constituent stream 418b from the group of constituent multimedia streams 418b, 420b, 422b, and 424b in step 516. The process of filtration removes one or more constituent streams from the group of constituent streams. For example, the filter 306 can delete all data related to the first constituent stream 418b included in the group of separate multimedia streams 418b, 420b, 422b, and 424b. Then, the filter 306 may pass the non-filtered constituent streams (e.g., a second constituent stream 420b and/or third constituent stream 422b) to the interface 310. In embodiments, the ancillary server 300 filters only the audio or only the video from a composite multimedia stream 416a. The filtered audio or video data may be associated with one or more of the constituent streams 416b.

The recomposer 306 may also compile a recomposition list for the constituent multimedia streams 418b, 420b, 422b, and 424b in step 518. A recomposition list is a list of one or more constituent streams that are required for recomposition into a new composite multimedia display. For example, the recomposer 306 may create a new composite multimedia display where only the first constituent stream 418b, second constituent stream 420b, and third constituent stream 422b are included in the display. Then, the recomposer can generate a new composite multimedia stream that includes the first constituent stream 418b, second constituent stream 420b, and third constituent stream 422b. In other embodiments, the recomposer 306 can recompose a new multimedia stream after one or more constituent streams of the separate multimedia streams 418b, 420b, 422b, and 424b is filtered. Yet, before recomposing the new multimedia stream, the recomposer must retrieve the constituent streams.

The ancillary server 300 may then determine if another constituent stream needs to be decomposed in step 520. For example, the ancillary server 300 may extract a first constituent multimedia stream 418b but may still need to extract a second constituent multimedia stream 420b. If the ancillary server 300 does need to decompose another constituent stream, the method 500 flows YES back to the determine step 512. However, if the ancillary server 300 does not need to decompose another constituent stream, the method 500 flows NO where the ancillary server synthesizes the recomposition lists 522.

The ancillary server 300 can receive one or more target layout specifications for the constituent streams. A target layout specification defines what information the target application (e.g., the consumer module 1 226, database 230, etc.) requires. The layout specification may also define a layout for a new multimedia display which can include two or more constituent streams. In embodiments, the new multimedia display may include constituent streams from two or more different instances of conferences (e.g., a constituent stream from conference A and a constituent stream from conference B). The ancillary server 300 can synthesize these lists by selecting the required constituent streams and providing those streams to the recomposer 306.

After synthesizing the recomposition lists, a recomposer 306 can recompose the constituent streams. Recomposing the streams can mean creating new composite displays with two or more constituent streams, sending one or more constituent streams to a target application, or processing the one or more constituent streams in one way or another. For example, the recomposer 306 may send the separate multimedia streams 418b, 420b, 422b, and 424b to an interface 310. The interface 310 may send a first multimedia stream 418b to a first user application (i.e., consumer module 1 226) and a second multimedia stream 420b to a second user application (i.e., multimedia content store 230). The recomposer 306 can also send a new composite multimedia stream for a new composite multimedia display to the interface 310 for sending to a target application. The recomposed images can also be reformatted. For example, a region of the display can be changed to increase or decrease the size of regions in the display or change the constituent stream providing the focal point of the display.

Extracting becomes important when indexing some of the data in a teleconference. Indexing is a process where only a specific participant(s) input is important. The ancillary server 300 can determine to which region of the composite display the participant is assigned. For example, if the only inputs of interest are from Joe Smith in Boston, the Boston feed for the teleconference is noted and the control data for that constituent stream is determined. Then, using the control information, the Boston constituent stream is extracted. Thus, all inputs and only inputs from the Boston stream are retrieved for use. Further, the times of the inputs can be recorded with the extracted stream giving a time-indexed constituent stream. The extracted and indexed stream may then be stored or used by an application.

The various recomposed streams may be stored. Thus, the new recomposed multimedia displays, the filtered, and the extracted constituent streams may be sent to data storage 230. Without all the other constituent streams, the filtered and extracted streams require far less storage and are not as intensive to process by the applications 226 or 228.

Example:

An example of decomposing and recomposing an image is presented hereinafter. First, the example explains how a continuous presence videoconference is created by the multimedia server 202 and explains the control information used by multimedia server 202 to create the videoconference. Then, the example shows how the same control information can also be used by an ancillary server 218 for the purpose of (video) stream decomposition.

Audio/Video Continuous Presence Conference Setup:

The example describes video conference setup using MSML (a popular media server control protocol). The multimedia server 202 sends a command to create the conference. The command is similar to the control information described above and provided again below:

```
<msml version="1.1">
 <createconference name="qsplit">
  <audiomix>
   <asn/>
   <n-loudest n="1"/>
  </audiomix>
  <videolayout type="text/msml-basic-layout">
   <root size="CIF"/>
   <region id="1" left="0" top="0" relativesize="⅔"/>
   <region id="2" left="67%" top="0" relativesize="⅓"/>
   <region id="3" left="67%" top="33%" relativesize="⅓"/>
   <region id="4" left="67%" top="67%" relativesize="⅓"/>
   <region id="5" left="33%" top="67%" relativesize="⅓"/>
   <region id="6" left="0" top="67%" relativesize="⅓"/>
  </videolayout>
 </createconference>
</msml>
```

The control information is an example MSML conference creation command and creates a six-region layout similar to that shown in FIG. 1.

Following the conference creation, participants are added into the conference. Participants can either be statically assigned to a region in the layout upon joining the conference or the region mapping can be dynamic based on a particular participant attribute, e.g., the loudest speaker always occupies region 1. An example of static control information that can generate a static assignment was described earlier and is repeated below:

```
<!- Join to region 1 -->
<msml version="1.1">
    <join id1="conn:1" id2="conf:qsplit">
        <stream media="audio"/>
        <stream media="video" dir="to-id1"/>
        <stream media="video" dir="from-id1" display="1"/>
    </join>
</msml>
<!- Join to region 2 -->
<msml version="1.1">
    <join id1="conn:2" id2="conf:qsplit">
        <stream media="audio"/>
        <stream media="video" dir="to-id1"/>
        <stream media="video" dir="from-id1" display="2"/>
    </join>
</msml>
<!- Join to region 3 -->
<msml version="1.1">
    <join id1="conn:3" id2="conf:qsplit">
        <stream media="audio"/>
        <stream media="video" dir="to-id1"/>
        <stream media="video" dir="from-id1" display="3"/>
    </join>
</msml>
<!- Join to region 4 -->
.........
<!- Join to region 5 -->
.........
<!- Join to region 6 -->
```

This control information puts each participant into a selected region of the display 112 of FIG. 1.

Decomposing the Conference Video Stream:

The ancillary server 218 now accesses the information content of the two commands shown above to deconstruct how the composite conference video frames are created and which stream is mapped to which area of the layout template. Thus, the ancillary server 218 uses the same control information used to create the composite video stream to decompose the composite video stream.

In the example above, for instance, the composite picture is of 'CIF' resolution, which is 352×288 pixels. From the conference create command, the ancillary server 218 can understand that there are six component pictures in the composite frame. Furthermore, the ancillary server 218 can compute the sizes and locations of each component picture with the coordinate information in the control information. The sizes and locations of the regions in the composite layout are as follows:

Picture 1 114 (FIG. 1) is size 235 by 192 pixels;
Pictures 2 through 6 116, 118, 120, 122, and 124 (FIG. 1) are each size 117 by 96 pixels;
Picture 1 114 (FIG. 1) has top left coordinates of [0,0];
Picture 2 116 (FIG. 1) has top left coordinates of [236, 0];
Picture 3 118 (FIG. 1) has top left coordinates of [236, 97].

Similarly, the ancillary server 218 can find the top right, bottom left, and bottom right coordinates for each component picture.

Although the above control information allows the ancillary server 218 to decompose various regions in the composite image, static control information does not specify how participants joining the conference are mapped to the regions of the layout. The "display=n" field in the join command identifies the region to which a particular stream is assigned. But the ancillary server 218 performing the video decomposition needs additional knowledge to map dynamically a conference participant to a given region in the layout. This information is provided by dynamic control information. Examples of dynamic control information includes two real-time control messages exchanged between the ancillary server 218 and the MCU 210. The example real-time control messages are:

AUDIT_CONFERENCE Message:

The AUDIT_CONFERENCE message is sent by the ancillary server 218 to the MCU 210. Upon receipt, the MCU 210 responds by sending a list of all conference participants to the Recoding UA.

MAP_CONNECTION Message:

The MAP_CONNECTION message is also sent by the ancillary server 218 to the MCU 210. Upon receipt, the MCU 210 responds with the Username associated with the connection identifier.

These message exchanges allow the ancillary server 218 to determine, for example, that "conn:1" is "User1". This information, in turn, allows the ancillary server 218 to handle commands from the consumer module 226, such as, "record all of User1's active participation." Thus, with the control information, both dynamic and static control information, the ancillary server 218 can process the composite video image for the consumer module 226.

Figure 6:
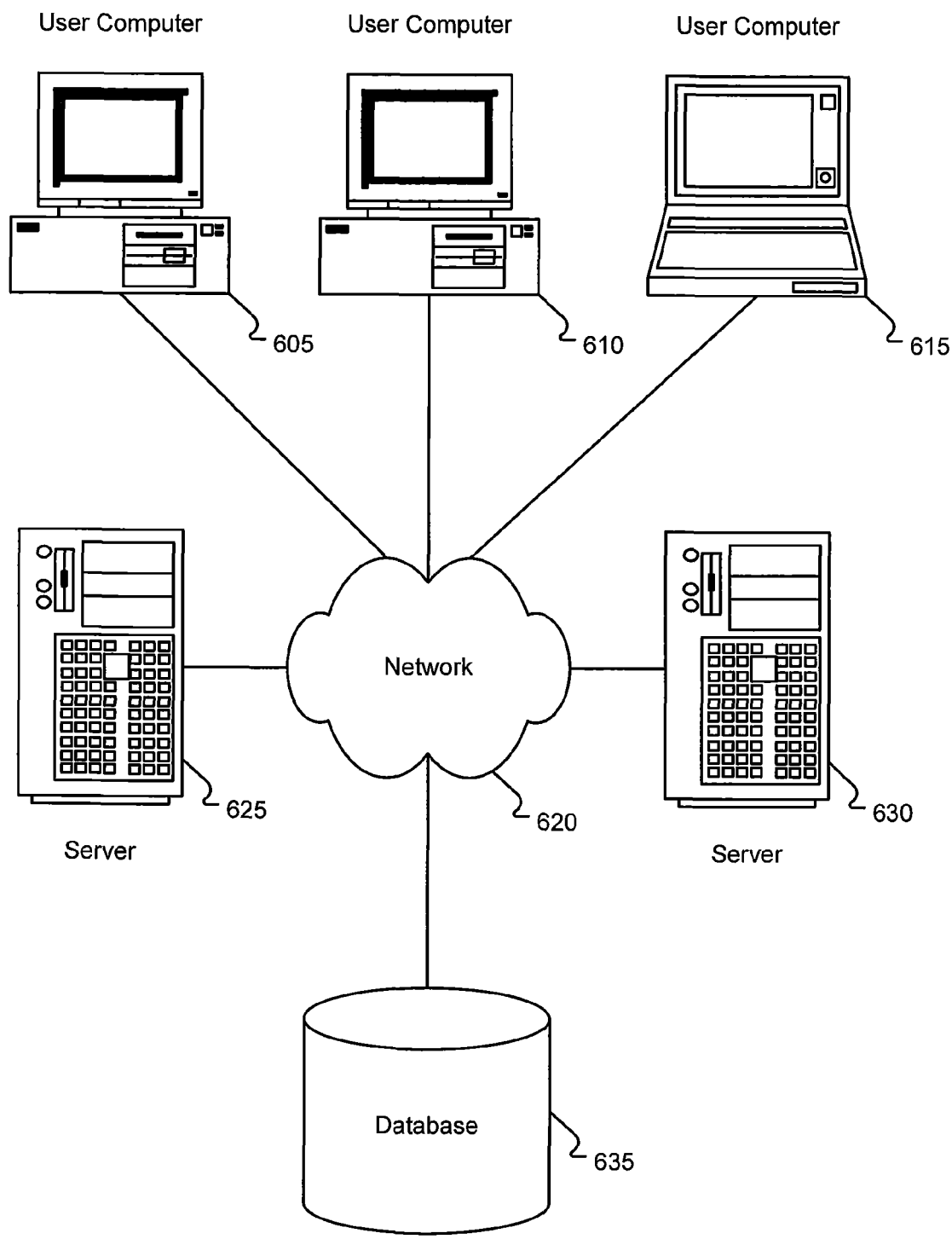
FIG. 6 is a block diagram of an embodiment of a computer system environment in which the systems and methods may be executed.

FIG. 6 illustrates a block diagram of a system 600 that may function as system 200 to provide decomposed composite multimedia streams. The system 600 includes one or more user computers 605, 610, and 615. The user computers 605, 610, and 615 may be general purpose personal computers (including, merely by way of example, personal computers and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 605, 610, 615 may also have any of a variety of applications, including for example, database client and/or server applications, and web browser applications. Alternatively, the user computers 605, 610, and 615 may be any other electronic device, such as a thin-client computer, Internet-enabled mobile telephone, and/or personal digital assistant, capable of communicating via a network (e.g., the network 620 described below) and/or displaying and navigating web pages or other types of electronic documents. Although the exemplary system 600 is shown with three user computers, any number of user computers may be supported.

System 600 further includes a network 620. The network 620 may can be any type of network familiar to those skilled in the art that can support data communications using any of a variety of commercially-available protocols, including without limitation TCP/IP, SNA, IPX, AppleTalk, and the like. Merely by way of example, the network 620 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 602.11 suite of protocols, the Bluetooth™ protocol known in the art, and/or any other wireless protocol); and/or any combination of these and/or other networks. The network 620 may be the same or similar to network 214.

The system may also include one or more server computers 625, 630. One server may be a web server 625, which may be used to process requests for web pages or other electronic documents from user computers 605, 610, and 620. The web server can be running an operating system including any of those discussed above, as well as any commercially-available server operating systems. The web server 625 can also run a variety of server applications, including HTTP servers, FTP servers, CGI servers, database servers, Java servers, and the like. In some instances, the web server 625 may publish operations available operations as one or more web services.

The system 600 may also include one or more file and or/application servers 630, which can, in addition to an operating system, include one or more applications accessible by a client running on one or more of the user computers 605, 610, 615. The server(s) 630 may be one or more general purpose computers capable of executing programs or scripts in response to the user computers 605, 610 and 615. As one example, the server may execute one or more web applications. The web application may be implemented as one or more scripts or programs written in any programming language, such as Java™, C, C#™ or C++, and/or any scripting language, such as Perl, Python, or TCL, as well as combinations of any programming/scripting languages. The application server(s) 630 may also include database servers, including without limitation those commercially available from Oracle, Microsoft, Sybase™, IBM™ and the like, which can process requests from database clients running on a user computer 605.

The web pages created by the web application server 630 may be forwarded to a user computer 605 via a web server 625. Similarly, the web server 625 may be able to receive web page requests, web services invocations, and/or input data from a user computer 605 and can forward the web page requests and/or input data to the web application server 630. In further embodiments, the server 630 may function as a file server. Although for ease of description, FIG. 6 illustrates a separate web server 625 and file/application server 630, those skilled in the art will recognize that the functions described with respect to servers 625, 630 may be performed by a single server and/or a plurality of specialized servers, depending on implementation-specific needs and parameters. The computer systems 605, 610, and 615, file server 625 and/or application server 630 may function as multimedia servers 202, ancillary servers 216, 218, 220, and/or 222, or other systems described herein.

The system 600 may also include a database 635, which may be the same or similar to multimedia content store 230, 302, or 306. The database 635 may reside in a variety of locations. By way of example, database 635 may reside on a storage medium local to (and/or resident in) one or more of the computers 605, 610, 615, 625, 630. Alternatively, it may be remote from any or all of the computers 605, 610, 615, 625, 630, and in communication (e.g., via the network 620) with one or more of these. In a particular set of embodiments, the database 635 may reside in a storage-area network ("SAN") familiar to those skilled in the art. Similarly, any necessary files for performing the functions attributed to the computers 605, 610, 615, 625, 630 may be stored locally on the respective computer and/or remotely, as appropriate. In one set of embodiments, the database 635 may be a relational database, such as Oracle 10i™, that is adapted to store, update, and retrieve data in response to SQL-formatted commands.

Figure 7:
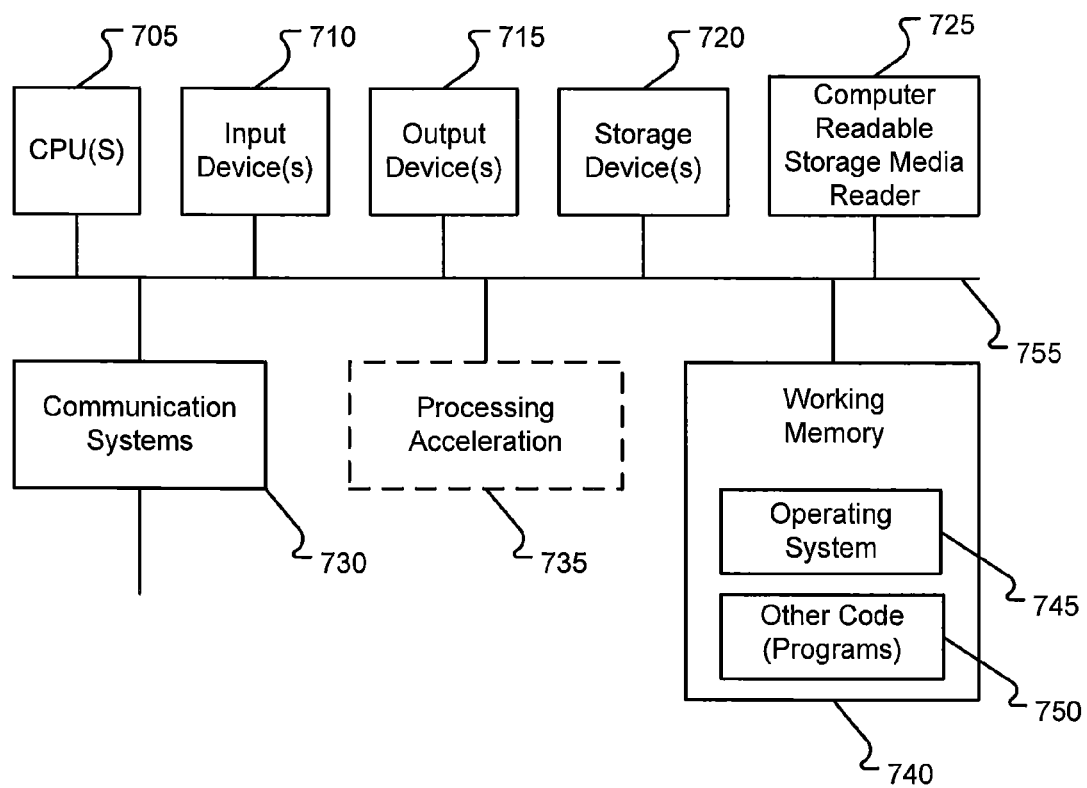
FIG. 7 is a block diagram of a computer system in which the systems and methods may be executed.

FIG. 7 illustrates one embodiment of a computer system 700 upon which multimedia server 202, ancillary servers 216, 218, 220, and/or 222, or other systems described herein may be deployed or executed. The computer system 700 is shown comprising hardware elements that may be electrically coupled via a bus 755. The hardware elements may include one or more central processing units (CPUs) 705; one or more input devices 710 (e.g., a mouse, a keyboard, etc.); and one or more output devices 715 (e.g., a display device, a printer, etc.). The computer system 700 may also include one or more storage device 720. By way of example, storage device(s) 720 may be disk drives, optical storage devices, solid-state storage device such as a random access memory ("RAM") and/or a read-only memory ("ROM"), which can be programmable, flash-updateable and/or the like.

The computer system 700 may additionally include a computer-readable storage media reader 725; a communications system 730 (e.g., a modem, a network card (wireless or wired), an infra-red communication device, etc.); and working memory 740, which may include RAM and ROM devices as described above. In some embodiments, the computer system 700 may also include a processing acceleration unit 735, which can include a DSP, a special-purpose processor and/or the like.

The computer-readable storage media reader 725 can further be connected to a computer-readable storage medium, together (and, optionally, in combination with storage device (s) 720) comprehensively representing remote, local, fixed, and/or removable storage devices plus storage media for temporarily and/or more permanently containing computer-readable information. The communications system 730 may permit data to be exchanged with the network 720 and/or any other computer described above with respect to the system 700. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 700 may also comprise software elements, shown as being currently located within a working memory 740, including an operating system 745 and/or other code 750, such as program code implementing the ancillary server 300. It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

An alternative embodiment provides for the ancillary server 300 to receive two or more composite multimedia stream 314 from two or more video conference instances. The decomposer 304 can decompose the two or more composite multimedia streams 314. Thus, the decomposer 304 can product constituent parts for two or more video conferences. The recomposer 306 can then recompose the constituent parts from the different video conferences into a third composite image or into a new display. Thus, if an application is interested in parts of separate video conferences, those parts can be placed together for the application.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. A method, comprising:
a processor receiving control information and a composite multimedia stream, the composite multimedia stream providing a composite multimedia display and the control information describing a characteristic of the composite multimedia stream;
the processor determining, from the control information, first and second regions of the composite multimedia display;
the processor determining, for a determined time and with the control information, a first constituent stream of the composite multimedia stream associated with the first region of the composite multimedia display; and
the processor extracting, from the composite multimedia stream, the first constituent stream of the composite multimedia stream.

2. The method as defined in claim 1, wherein the control information includes static control information and dynamic control information.

3. The method as defined in claim 1, further comprising:
for the predetermined time, the processor determining, with dynamic control information, a second constituent stream of the multimedia steam associated with a second region of the composite multimedia display; and
the processor extracting the second constituent stream of the multimedia stream from the composite multimedia stream.

4. The method as defined in claim 3, further comprising:
the processor sending the first constituent stream of the multimedia stream to a first user application; and
the processor sending the second constituent stream of the multimedia stream to a second user application.

5. The method as defined in claim 3, wherein the composite multimedia stream comprises at least three constituent streams, and further comprising:
the processor filtering out the first constituent stream of the composite multimedia stream; and
the processor sending at least one of the second constituent stream of the composite multimedia stream or a third constituent stream of the composite multimedia stream to a user application.

6. The method as defined in claim 5, wherein the user application is a multimedia content store.

7. The method as defined in claim 5, further comprising the user application recomposing the second constituent stream of the composite multimedia stream and the third constituent stream of the composite multimedia stream into a new composite multimedia stream, wherein the new multimedia stream provides a new composite multimedia display.

8. The method as defined in claim 1, wherein the control information describes a layout for the composite multimedia display.

9. The method as defined in claim 1, wherein the control information temporally describes which constituent stream of the composite multimedia stream is displayed in which region of the composite multimedia display.

10. An ancillary server comprising:
a processor operable to read and operable to execute two or more computer executable modules;
a memory in communication with the processor, the memory operable to store and operable to send the two or more computer executable modules to the processor; and
the two or more computer executable modules comprising:
a control information database operable to store control information that describes a format for a first composite multimedia stream;
a decomposer module in communication with the control information database, the decomposer module operable to decompose the first composite multimedia stream into two or more constituent streams of the first composite multimedia stream based on the control information; and a recomposer module in communication with the decomposer module, the recomposer module operable to recompose the two or more constituent streams of the first composite multimedia stream into a second composite multimedia stream.

11. The ancillary server as defined in claim 10, wherein the recomposer module further comprises a filter module operable to filter out one of the constituent streams of the first composite multimedia stream to create the second composite multimedia stream.

12. The ancillary server as defined in claim 10, further comprising a preferences database in communication with the recomposer module, the preferences database operable to store a preference for the second composite multimedia stream, wherein the preference describes a desired format for the second composite multimedia stream.

13. The ancillary server as defined in claim 10, wherein the control information describes a format for a composite multimedia display provided by the first composite multimedia stream, wherein the format includes a layout for the composite multimedia display, the composite multimedia display layout having two or more regions.

14. The ancillary server as defined in claim 13, wherein the decomposer module is operable to receive dynamic control information, wherein the dynamic control information describes to which region of the composite multimedia display layout a constituent stream of the composite multimedia stream is assigned.

15. The ancillary server as defined in claim 14, wherein the dynamic control information changes in response to an assignment change to the composite multimedia display layout.

16. The ancillary server as defined in claim 10, further comprising a second ancillary server.

17. A non-transient computer program product including computer executable instructions stored onto a computer readable medium which, when executed by a processor of a computer, cause the computer to perform method for recomposing a composite multimedia stream, the instructions comprising:
   instructions to receive static control information, wherein the static control information describes a layout for a composite multimedia display sent from a multipoint control unit, wherein the layout includes two or more regions defined on a multimedia display;
   instructions to receive the composite multimedia stream, wherein the composite multimedia stream includes two or more constituent streams, wherein each constituent stream is a multimedia stream assigned to one of the regions of the display;
   instructions to receive dynamic control information, wherein the dynamic control information includes information about which of the two or more constituent streams of the composite multimedia stream is an active speaker;
   instructions to determine which region of the two or more regions defined on a multimedia display is displaying the constituent stream of an active speaker; and
   instructions to extract the constituent stream of the composite multimedia stream assigned to the determined region.

18. The non-transient computer program product as defined in claim 17, wherein the region to which the multimedia stream is assigned changes periodically.

19. The non-transient computer program product as defined in claim 17, further comprising:
   instructions to receive new dynamic control information, wherein the new dynamic control information describes a new region for the multimedia stream; and
   instructions to extract the multimedia stream from the new region.

20. The non-transient computer program product as defined in claim 17, further comprising:
   instructions to receive second static control information, wherein the second static control information describes a second layout for a second composite multimedia display sent from a multipoint control unit, wherein the second layout includes two or more regions defined on a second multimedia display;
   instructions to receive a second composite multimedia stream, wherein the second composite multimedia stream includes two or more constituent streams, wherein each constituent stream is a multimedia stream assigned to one of the regions of the second multimedia display;
   instructions to receive second dynamic control information, wherein the second dynamic control information includes second information about which of the two or more constituent streams of the second composite multimedia stream are using a microphone;
   instructions to determine which region of the two or more regions defined on a second multimedia display is displaying the constituent stream of an active speaker;
   instructions to extract the second multimedia stream assigned to the determined region; and
   instructions to recompose the second multimedia stream with the multimedia stream into a third composite multimedia display.

* * * * *